United States Patent [19]

D'Aluisio

[11] Patent Number: 5,201,537
[45] Date of Patent: Apr. 13, 1993

[54] BICYCLE FRAME

[75] Inventor: Christopher P. D'Aluisio, West Redding, Conn.

[73] Assignee: Cannondale Corporation, Georgetown, Conn.

[21] Appl. No.: 714,138

[22] Filed: Jun. 11, 1991

[51] Int. Cl.$^5$ ............................................. B62K 19/00
[52] U.S. Cl. ................................. 280/281.1; 280/274
[58] Field of Search ................... 280/281.1, 274, 283, 280/279

[56] References Cited

U.S. PATENT DOCUMENTS

| D. 143,572 | 1/1946 | Bruce | 280/281.1 X |
|---|---|---|---|
| 642,493 | 1/1900 | Rosenberg | 280/281.1 |
| 694,567 | 3/1902 | Moore | 280/281.1 |
| 1,220,938 | 3/1917 | Blanchard | 280/281.1 |
| 2,550,941 | 5/1951 | Schuricht | 280/274 X |
| 4,813,696 | 3/1989 | Moulton | 280/281.1 |
| 4,921,267 | 5/1990 | Kirk | 280/281.1 |

FOREIGN PATENT DOCUMENTS

89/09718  10/1989  World Int. Prop. O. ....... 280/281.1

Primary Examiner—Margaret A. Focarino
Assistant Examiner—Carla Mattix
Attorney, Agent, or Firm—Lyon & Lyon

[57] ABSTRACT

An improved form of bicycle frame comprising a down tube attached to a seat tube at their lower ends and a back top tube affixed between the down tube and seat tube to form a first large triangle similar to a conventional bicycle frame. The upper end of the down tube is connected to a head tube, as is an upper end of a front top tube. A lower end of the front top tube is connected intermediate the ends of the back top tube thereby forming a small triangle between a portion of the down tube, a portion of the back top tube, and the front top tube. This smaller triangle functions as a gusset to provide a new frame configuration and to increase the strength thereof as well as increase the crotch clearance of the frame.

3 Claims, 1 Drawing Sheet

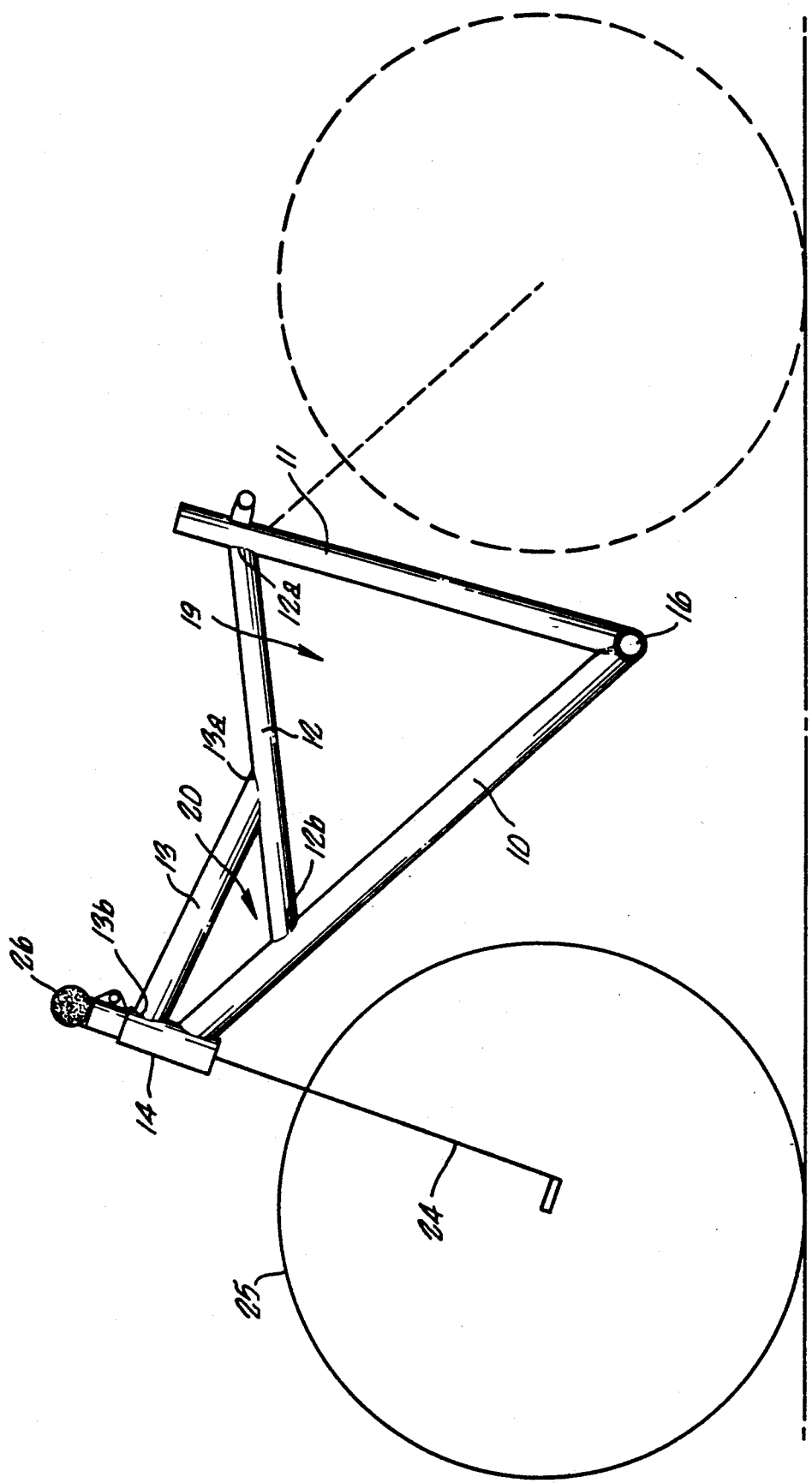

BICYCLE FRAME

The present invention relates to bicycles, and more particularly to a new form of bicycle frame.

Bicycles typically comprise a frame essentially in the form of a triangle having a horizontal cross bar or top tube connected at one end to a head tube which receives the steering tube of the bicycle fork, and connected at its rear end to a seat tube. The seat tube extends downwardly from the cross bar, and a downtube extends at an angle downwardly from the head tube, with the lower ends of the seat tube and downtube being joined together at a journal for the pedal crank assembly. The fork carries the front wheel, and suitable tubes extend rearwardly from the frame for carrying the rear wheel.

Although such bicycle frames are suitable, in some instances it is desirable to provide a stronger frame so as to reduce the chances of frame breakage under severe riding conditions. Additionally, it is desirable to provide additional space between the rider and the top tube, referred to as crotch clearance.

Accordingly, a principal object of the present invention is to provide a new form of bicycle frame.

Other objects, features and advantages of the present invention will become better understood through a consideration of the following description, taken in conjunction with the drawing, the single sheet of which illustrates a bicycle frame according to the present invention.

DETAILED DESCRIPTION

Turning now to the drawing, the same diagrammatically illustrates a bicycle frame comprising a downtube 10, seat tube 11, back top tube 12, front top tube 13, and head tube 14. The upper end of the downtube 10 and the upper end of the front top tube 13 are welded to the head tube 14 in a conventional manner. The lower end of the downtube 10 and the lower end of the seat tube 11 are welded together to provide a journal 16 for the pedal crank assembly (not shown). The upper end of the seat tube 11 is adapted to receive a conventional seat post and seat (not shown).

The rear 12a or back end of the back top tube 12 is welded toward the upper end of the seat tube 11 as shown in the drawing, and the front end 12b thereof is welded toward the upper end of the downtube 10 as shown. The tubes 10, 11 and 12 form a large triangle 19 similar to the usual bicycle frame, but modified according to the present invention as described below.

The lower end 13a of the front top tube 13 is welded intermediate the ends 12b and 12a of the back top tube 12 to thus form a second smaller triangle 20. This small triangle 20 provides a "gusset" effect, and the resulting frame configuration is stronger than prior designs of the essentially single triangular type. The increase in strength particularly under fatigue loading conditions results from the described gusset effect created by the small triangle 20 formed by the upper end of the down tube 10, forward end of the back top tube 12 and the joining top tube 13. This new configuration also provides more crotch clearance because the back top tube 12 is lower than the usual cross bar or top tube normally extending between the top of the head tube 14 and top of the seat tube 11.

A front fork 24, front wheel 25 and handlebars 26 are illustrated diagrammatically associated with the head tube 14 in a conventional manner.

While an embodiment of the present invention has been shown and described, various modifications may be made without departing from the scope of the present invention, and all such modifications and equivalents are intended to be covered.

What is claimed is:

1. A bicycle frame comprising
a downtube having first and second ends,
a seat tube having first and second ends,
a heat tube,
the first end of the downtube being connected to the head tube, and the second end of the downtube being connected with the second end of the seat tube to form means for receiving a pedal crank assembly,
a back top tube having first and second ends, with the first end thereof being attached intermediate the ends of the downtube, and the second end thereof being attached toward the first end of the seat tube, and
a first portion of the downtube, a first portion of the seat tube, and the back top tube forming a first large triangle, and
a front top tube having first and second ends, with the first end affixed to the head tube near the first end of the downtube, and the second end being affixed intermediate the ends of the back top tube, a second portion of the downtube, a portion of the back top tube, and the front top tube forming a small triangle for providing increased strength to the bicycle frame.

2. A bicycle frame comprising
a downtube having first and second ends,
a seat tube having first and second ends,
a head tube,
the first end of the downtube connected to the head tube, and the second end of the downtube connected near the second end of the seat tube,
a back top tube having first and second ends, the first end thereof attached near the first end of the downtube and the second end thereof attached near the first end of the seat tube whereby a first triangular region is formed by a first portion of the downtube, a first portion of the seat tube, and the back top tube, and
a front top tube having first and second ends, the first end affixed to the head tube near the first end of the downtube and the second end affixed intermediate the ends of the back top tube whereby a second triangular region is formed by a second portion of the downtube, a portion of the back top tube, and the front top tube providing increased strength to the bicycle frame.

3. A bicycle frame comprising
a downtube having first and second ends,
a seat tube having first and second ends,
a head tube,
the first end of the downtube attached to the head tube and the second end of the downtube attached with the second end of the seat tube,
a back top tube having first and second ends, the first end of the back top tube attached to the downtube intermediate the ends of the downtube and closer to the first end of the downtube than the second end of the downtube and the second end of the back top tube attached to the seat tube intermediate the ends of the seat tube and closer to the first end of the seat tube than the second end of the seat tube whereby a first triangular region is formed by a first portion of the downtube, a first portion of the seat tube, and the back top tube, and a front top tube having first and second ends, the first end affixed to the head tube near the first end of the downtube and the second end affixed to the back top tube intermediate the ends of the back top tube whereby a second triangular region is formed by a second portion of the downtube, a portion of the back top tube, and the front top tube for providing increased strength to the bicycle frame.

* * * * *

REEXAMINATION CERTIFICATE (4003rd)

United States Patent [19]
D'Aluisio

[11] B1 5,201,537
[45] Certificate Issued Feb. 29, 2000

[54] BICYCLE FRAME

[75] Inventor: Christopher P. D'Aluisio, West Redding, Conn.

[73] Assignee: Cannondale Corporation, Georgetown, Conn.

Reexamination Request:
No. 90/005,080, Aug. 21, 1998

Reexamination Certificate for:
Patent No.: 5,201,537
Issued: Apr. 13, 1993
Appl. No.: 07/714,138
Filed: Jun. 11, 1991

[51] Int. Cl.[7] .................................................. B62K 19/00
[52] U.S. Cl. ........................................ 280/281.1; 280/274
[58] Field of Search .......................................... 280/281.1

[56] References Cited

U.S. PATENT DOCUMENTS

| | | |
|---|---|---|
| 613,935 | 11/1898 | Norton . |
| 634,823 | 10/1899 | Johnson . |
| 793,294 | 6/1905 | Girard . |
| 2,151,533 | 3/1939 | Schwinn . |
| 2,579,097 | 12/1951 | Schwinn . |
| 4,082,307 | 4/1978 | Tait . |
| 4,427,209 | 1/1984 | Morita . |
| 4,660,854 | 4/1987 | Suzuki et al. . |
| 4,705,286 | 11/1987 | Lauzier et al. ........................ 280/281.1 |
| 4,733,881 | 3/1988 | Mueller . |
| 4,746,136 | 5/1988 | Kirk . |
| 5,076,601 | 12/1991 | Duplessis ............................. 280/281.1 |

FOREIGN PATENT DOCUMENTS

| | | |
|---|---|---|
| 423339 | 12/1910 | France . |
| 98673 | 9/1897 | Germany . |
| 21473 | of 1900 | United Kingdom . |
| 6807 | of 1900 | United Kingdom . |

OTHER PUBLICATIONS

RMS Bikes brochure, 1990.
*Mountain Biking U.K.*, vol. 3 No. 5, dated May 1990.
*Mountain Biking U.K.*, vol. 3 No. 6, dated Jun. 1990.

*Primary Examiner*—Kevin Hurley

[57] ABSTRACT

An improved form of bicycle frame comprising a down tube attached to a seat tube at their lower ends and a back top tube affixed between the down tube and seat tube to form a first large triangle similar to a conventional bicycle frame. The upper end of the down tube is connected to a head tube, as is an upper end of a front top tube. A lower end of the front top tube is connected intermediate the ends of the back top tube thereby forming a small triangle between a portion of the down tube, a portion of the back top tube, and the front top tube. This smaller triangle functions as a gusset to provide a new frame configuration and to increase the strength thereof as well as increase the crotch clearance of the frame.

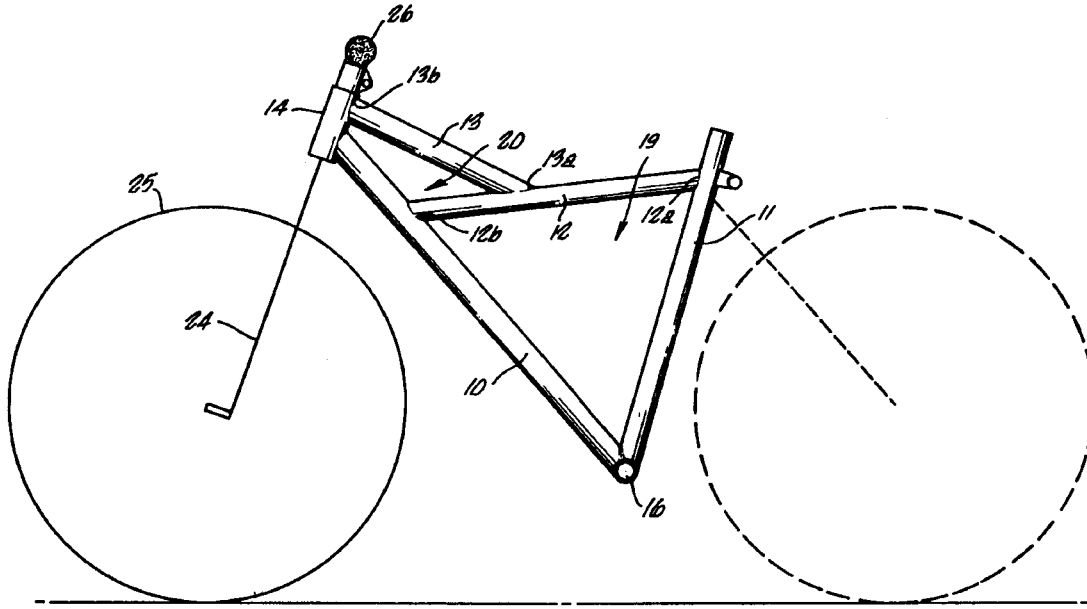

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

+c ONLY THOSE PARAGRAPHS OF THE SPECIFICATION AFFECTED BY AMENDMENT ARE PRINTED HEREIN.

Column 1, lines 51–65:

The lower end 13a of the front top tube 13 is welded intermediate the ends 12b and 12a of the back top tube 12 to thus form a second smaller triangle 20. *As shown in FIG. 1, in the preferred embodiment, the front top tube 13 and the upper end of the downtube 10 are joined to the head tube 14 such that an extension of the front top tube 13 and of the downtube 10 converge at point, which is behind a leading edge of the head tube 14.* This small triangle 20 provides a "gusset" effect, and the resulting frame configuration is stronger than prior designs of the essentially single triangular type. The increase in strength particularly under fatigue loading conditions results from the described gusset effect created by the small triangle 20 formed by the upper end of the down tube 10, forward end of the back top tube 12 and the joining top tube 13. This new configuration also provides more crotch clearance because the back top tube 12 is lower than the usual cross bar or top tube normally extending between the top of the head tube 14 and top of the seat tube 11.

AS A RESULT OF REEXAMINATION, IT HAS BEEN DETERMINED THAT:

Claims 1–4 are cancelled.

* * * * *